Feb. 24, 1925.
L. NIELSEN
1,527,324
DEMOUNTABLE RIM
Filed May 19, 1923
2 Sheets-Sheet 1
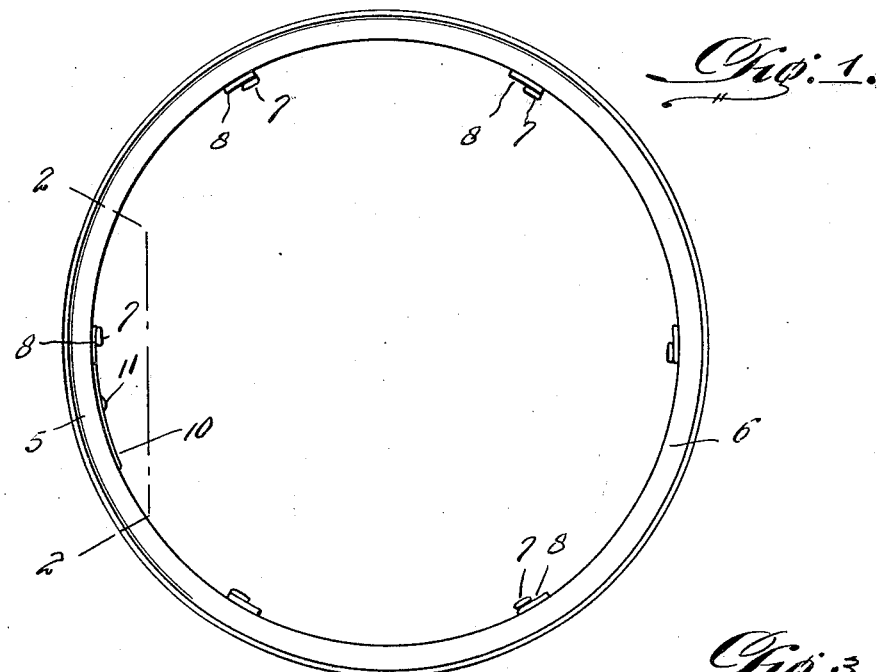
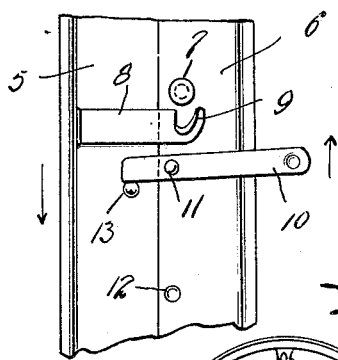
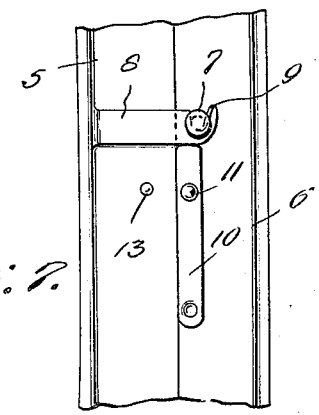
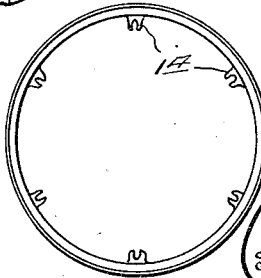
Leo Nielsen,
Inventor
Witnesses:
Attorney Feb. 24, 1925.
L. NIELSEN
DEMOUNTABLE RIM
Filed May 19, 1923
1,527,324
2 Sheets-Sheet 2
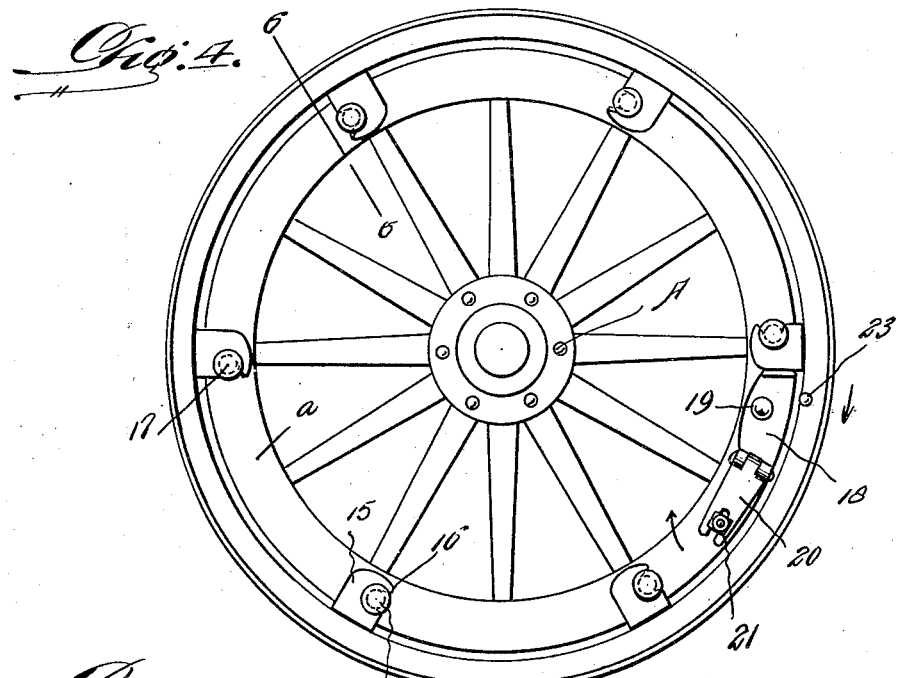
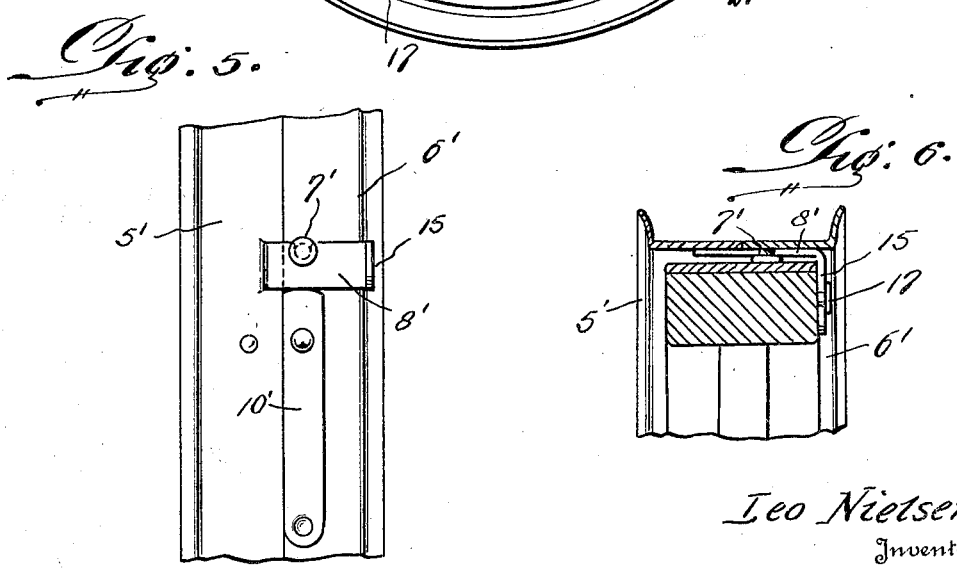

Patented Feb. 24, 1925.

1,527,324

UNITED STATES PATENT OFFICE.

LEO NIELSEN, OF LOGAN, UTAH.

DEMOUNTABLE RIM.

Application filed May 19, 1923. Serial No. 640,082.

*To all whom it may concern:*

Be it known that I, LEO NIELSEN, a citizen of the United States, residing at Logan, in the county of Cache and State of Utah, have invented certain new and useful Improvements in Demountable Rims, of which the following is a specification.

My invention relates to an improvement in demountable rims, and has for its primary object, the provision of such a device, that is so constructed as to permit of the ready positioning or removal of a tire upon or from the rim, the device comprising essentially a rim that includes a pair of half sections that are adapted to be joined together in a novel, simple and expeditious manner.

A further object of the invention is to provide a rim that is to be used in conjunction with a specific form of wheel, whereby the rim may be readily attached to or removed from the wheel.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a side elevation of the preferred embodiment of the invention.

Figure 2 is a fragmentary elevation of the inner side of the rim before the sections comprising the rim have been secured together.

Figure 3 is a view similar to Figure 2, showing the said sections of the rim in locked relation.

Figure 4 is a view similar to Figure 1, of a slightly modified form of rim shown as applied to its complementary wheel.

Figure 5 is a view similar to Figure 3 of the type of rim shown in Figure 4.

Figure 6 is a detail cross section upon the line 6—6 of Figure 4.

Figure 7 is a side elevation of a rim of the type shown in Figures 1 to 3 equipped with integral wheel bolt engaging brackets.

First, having reference to Figures 1, 2, 3 and 7, my novel rim comprises a pair of half sections 5 and 6, respectively, the outer edges of which are formed with the usual tire bead receiving flanges, while the inner edges thereof are plane, and are adapted to be positioned in close relation with each other.

The inner face of the rim section 6 is equipped adjacent its plane edge with pendent and spaced headed pins 7, while the similar face of the rim section 6 is equipped with laterally extending arms 8, that are preferably formed integrally with the rim section, and are of such a length as to engage beneath the rim section 6 when the pair of sections are positioned together, as more clearly shown in Figures 2 and 3. Projecting ends of these arms 8 are notched as at 9, these notches adapted for receiving the said pins 7 when the rim section 5 has been slightly rotated with respect to its complementary section 6 for maintaining the same in locked relation with each other.

The rim section 6 is equipped with a flat-like lever 10 that is pivoted adjacent one end as at 11 to said section, and at a point slightly distant from one of the headed pins 7. After the rim sections have been positioned as shown in Figure 2, this lever 10 is swung downwardly preferably by foot power, the inner end thereof contacting the adjacent arm 8 for consequently rotating the section 5, for thereby positioning the headed pins 7 within the notches 9 of the arms. For maintaining the lever 10 in a locked position as shown in Figure 3, the outer end of the same is formed with a depression that is adapted to receive a tit 12 formed upon the section 6.

The rim section 5 is further equipped upon its under surface with a pin 13, that is adapted to be engaged by the inner end of the lever 10, when the same is swung in the direction of the right hand arrow in Figure 2, for thereby rotating the rim section 5 as per the left hand arrow in this figure, for consequently disengaging the arms 8 from the pins 7, for permitting of the disengagement of the pair of rim sections from each other, and a consequent removal of the tire from the rim.

The rim shown in Figures 1, 2 and 3 may be secured to a vehicle wheel through the medium of the usual clamps or if desired, the outermost rim section may be equipped at its outer edge with pendent finger brackets 14, that are adapted for engagement over the usual bolts of the vehicle wheels.

Referring to Figures 4, 5 and 6, this rim also includes a pair of rim sections 5' and 6', the rim section 6' being equipped with headed pins 7', while the rim section 5' is equipped with laterally extending arms 8', that are adapted for engagement beneath the under surface of the first mentioned rim section, when the same are positioned as shown in Figure 4, and are also formed with notches for receiving the said pins 7' when the lever 10' which is similar in all respects to the lever 10 of the preferred embodiment of the invention, has been moved to the position of Figure 5.

However, in this instance, the free ends of the arms 8' are formed with pendent legs 16 that are notched for receiving headed pins 17 that are carried by the outer side of the felly $a$ of a vehicle wheel A when the said rim is positioned thereon and slightly rotated in the direction of the pins.

As a means for maintaining the notches of the said legs in engagement with said pins 17, the outer side of the wheel felly $a$ is equipped with a lever 18, pivoted to the felly at 19, and adapted for engagement at its inner end with one of the adjacent legs 15 as the same is being swung to the position of Figure 4. Hingedly secured to the outer end of this lever 18 is a plate 20 bifurcated at its free end, and adapted for engagement over the screw threaded end of a bolt 21, that is carried by the wheel felly, after the lever has been moved to its locked position, and for securely maintaining the same in such position, it being understood of course that a nut 22 is to be positioned upon the said screw threaded end of the bolt 21. If desirable, the outer rim section 6' of the rim may be equipped with an operating rod 23.

In view of the above description, it will be at once apparent to those skilled in the art, that I have provided a highly improved form of demountable rim, and one that will not only permit of the expeditious positioning or removal of the tire, but one that may be readily attached to or removed from the vehicle wheel.

Although I have herein shown and described the preferred embodiments of the present invention, it is nevertheless to be understood that minor changes may be made therein without departing from the spirit and scope of the invention as claimed.

Having thus described my invention, what I claim as new, and desire to secure by Letters-Patent, is:

In combination with a vehicle wheel, wherein the outer side of the felly thereof is provided with headed pins, a demountable rim, inwardly extending notched legs formed adjacent the outer side of said rim and adapted for inter-engagement with the pins on the felly of said wheel, means for positively engaging said notched legs with said pins, and means for maintaining said notched legs in engagement with the pins comprising a lever pivoted on the felly and having one end thereof in engagement with the adjacent notched leg co-operating with the adjacent pin on the felly, the opposite end of said lever being hingedly connected to a plate, the free end of the latter being detachably secured to the felly by a fastening bolt.

In testimony whereof I affix my signature.

LEO NIELSEN.